United States Patent [19]
Bascope et al.

[11] 3,951,816
[45] Apr. 20, 1976

[54] CLARIFICATION TANK
[75] Inventors: Alberto H. Bascope; Eugene H. Grizzard, both of Huntington Beach, Calif.
[73] Assignee: Burmah Oil and Gas Company, Houston, Tex.
[22] Filed: June 28, 1971
[21] Appl. No.: 157,343

[52] U.S. Cl. ............................... 210/519; 210/525; 210/DIG. 25
[51] Int. Cl.[2] .......................................... B01D 21/24
[58] Field of Search ............... 210/83, 84, 519, 525, 210/537, 538, 539, 540, DIG. 21, 112, 114, 115

[56] References Cited
UNITED STATES PATENTS
2,593,036  4/1952  Koch .............................. 210/519 X
3,246,763  4/1966  Baum ............................. 210/519 X
3,452,869  7/1969  O'Neill ................................. 210/84
3,552,571  1/1971  Neuspiel ......................... 210/525 X Primary Examiner—Thomas G. Wyse
Assistant Examiner—F. F. Calvetti
Attorney, Agent, or Firm—Donald W. Canady

[57] ABSTRACT

A clarification tank having a plurality of pick-up trays and a central collection column which is connected to an externally located riser having a high volume discharge weir at the upper end thereof. The tank also includes a plurality of sand pan draw-offs connected to a collection piping system which permits gathering material from all of the sand pan drains in a single discharge line by static pressure differential.

1 Claim, 5 Drawing Figures

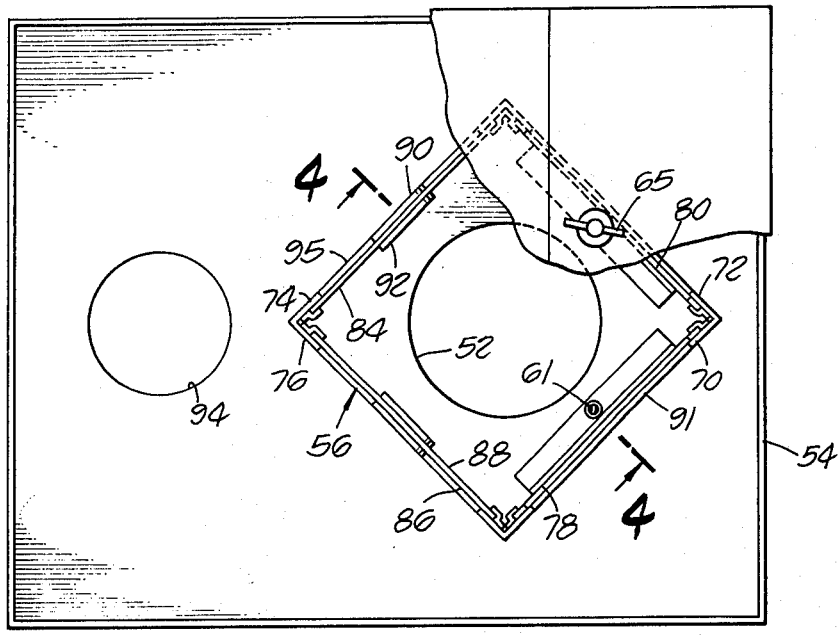
FIG. 3.
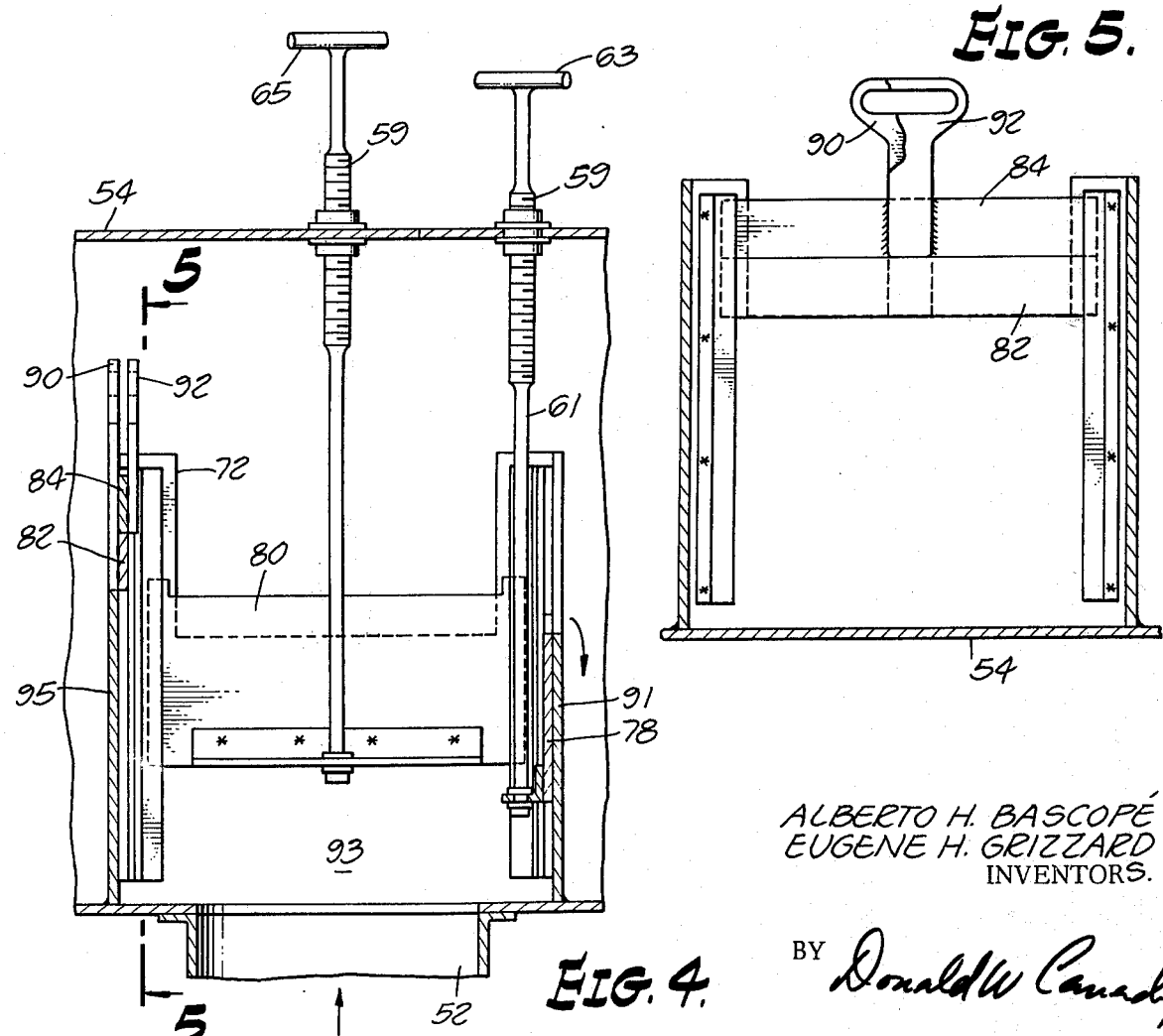
FIG. 5.
FIG. 4.
ALBERTO H. BASCOPÉ
EUGENE H. GRIZZARD
INVENTORS.
BY Donald W. Canady
ATTORNEY

CLARIFICATION TANK

BACKGROUND OF THE INVENTION a. Field of the Invention

Our invention relates to a clarification tank such as a flotation cell, a settling tank, or a holding tank, wherein a mixture of two or more liquid materials having different densities is allowed to settle to effect a gravity separation and the clarified liquid is removed from the bottom of the tank through a riser.

There are many industrial uses for clarification tank wherein a mixture of two or more liquids having different specific gravities are separated by what is basically a gravity settling process, wherein the lighter liquid material collects at the top of the liquid mixture and the heavier material settles to the bottom of the container housing the mixture. For example, such clarification techniques are used in the mining, metallurgical, chemical processing arts, and the oil industry — both in refinery operations and crude oil production.

Our present invention involves clarification tanks which are useful in each of the above operations, however, it is described herein with respect to crude oil production and waste water treatment required in production operations. In oilfield water flooding operations, which are commonly used as a secondary recovery method for crude oil production, oil is produced by injection of water into an oil bearing sand formation to displace the oil and water in the sand formation towards adjacent wells where it is brought to the surface. The oil thus produced is an oil-water mixture containing about 60 to 70% water, and the oil in such production mixtures is normally separated from the water by physical separation means, such as settling tanks. The water separated from this mixture still contains on the order of 50 to 500 ppm oil. Consequently, this waste water is subjected to further clean-up operations to remove the residual 50–500 ppm oil prior to final disposal of the waste water or reusing it in an industrial application. According to conventional practices, the residual small amount of oil is removed from the waste water in a flotation cell operation.

b. Description of the Prior Art

The separation of small amounts of oil from water in a flotation cell is accomplished by injecting air into the oil-water mixture under pressure and pumping the mixture into a retention tank and then introducing the pressurized mixture into the flotation cell at a point beneath the surface of the liquid. As the mixture is released into the body of liquid in the flotation cell, the air in solution is released and bubbles through the body of liquid in the cell and attaches to suspended oil particles which effectively reduces their specific gravity and causes the oil to collect near the surface of the liquid in the cell or tank where it can be skimmed off with a skimmer into a skimming trough.

The liquid level in a flotation cell is quite important and is controlled by manipulation of adjustable rings or weirs at the top of the water outlet risers to maintain the water level. According to the prior art, several water removal risers are spaced circumferentially around the tank. Hence the adjustment of the weirs at the top of the several risers must be done evenly as the water level is maintained, in order to prevent short circuiting or by-passing, that is, passage of the oil-water mixture directly from the inlet tube to one of the risers. The multiple riser system is difficult to adjust properly.

The by-passing phenomena may occur to a lesser or greater degree, and has the effect of reducing the effective residence time in the flotation cell, and thus decreases the quality of the water recovered from the cell since the air bubbles are not given sufficient opportunity to remove the residual oil by attaching to the oil particles and floating the oil to the surface. In addition, by-passing increases turbulence in the flotation cell, which also reduces oil removal capability.

The risers in prior art flotation cells, typically, are open to the inside of the tank and this arrangement increases the likelihood of by-passing.

Accurate liquid level control is also essential since too high a level will pass water with the skimmed oil. Liquid level control is accomplished in the prior art by removing adjustable rings in the top of water removal risers, or by using compartmented weir boxes such as that shown in U.S. Pat. No. 3,246,763. Compartment weir boxes are limited in the volume of water which can be removed with a given size weir box since water is removed effectively from only one opening.

According to the prior art, sand and sediment carried into the flotation cell with the oil-water mixture to be separated, are removed from the flotation cells by providing a conical bottom surface in the cell or tank and a rotary sweep to move the sand and sediment to an outlet for removal.

SUMMARY OF THE INVENTION

Our present invention relates to a clarification tank such as a flotation cell. More specifically, our invention relates to an apparatus for removing the clarified liquid from an area adjacent the bottom of the tank and the means associated with the water removal apparatus for controlling the liquid level in the tank.

It is an object of our present invention to provide a clarification tank which facilitates liquid level control with a single riser.

It is also an object of our present invention to provide a clarification tank wherein by-passing or short circuiting of the feed mixture to the outlet is minimized.

It is a further object of our invention to provide a weir box which facilitates removal of greater volumes of water by providing several openings in a single weir box.

According to the present invention, sand and sediment are removed from a clarification tank, such as a flotation cell, by providing a series of sand pan draw-offs through which sand and sediment are removed to a central collection line static pressure differential.

According to our present clarification tank design, water is removed from the cell or tank adjacent the bottom thereof, through a series of pick-up tubes which are connected to a central collection column or plenum chamber which is connected to an external vertical riser through which the clarified water is removed from the central collection tubes. The upper end of the vertical riser is provided with a weir assembly which is vertically adjustable so that the liquid level in the clarification tank can be accurately controlled by adjustment of a single weir. The weir device at the upper end of the riser is a four-sided enclosure positioned over the top of the riser tube to discharge water on all four sides into a weir box which is connected to an outlet tube for removal of the water. Sand and other solid particles which settle to the bottom of the cell, are withdrawn from the tank by several sand pan draw-offs which are connected to a central collection line.

BRIEF DESCRIPTION OF THE DRAWING

FIG. 3 is an enlarged plan view, partially in section, of the weir assembly, shown on the clarification tank illustrated in FIG. 1;

FIG. 4 is a cross sectional view, taken on line 4—4 of FIG. 3 showing the two adjustable weirs;

FIG. 5 is a cross sectional view, taken on line 5—5 of FIG. 4, showing the "fixed" weirs employed on two sides of the weir outlet.

DESCRIPTION OF THE PREFERRED EMBODIMENT

Figure 1:
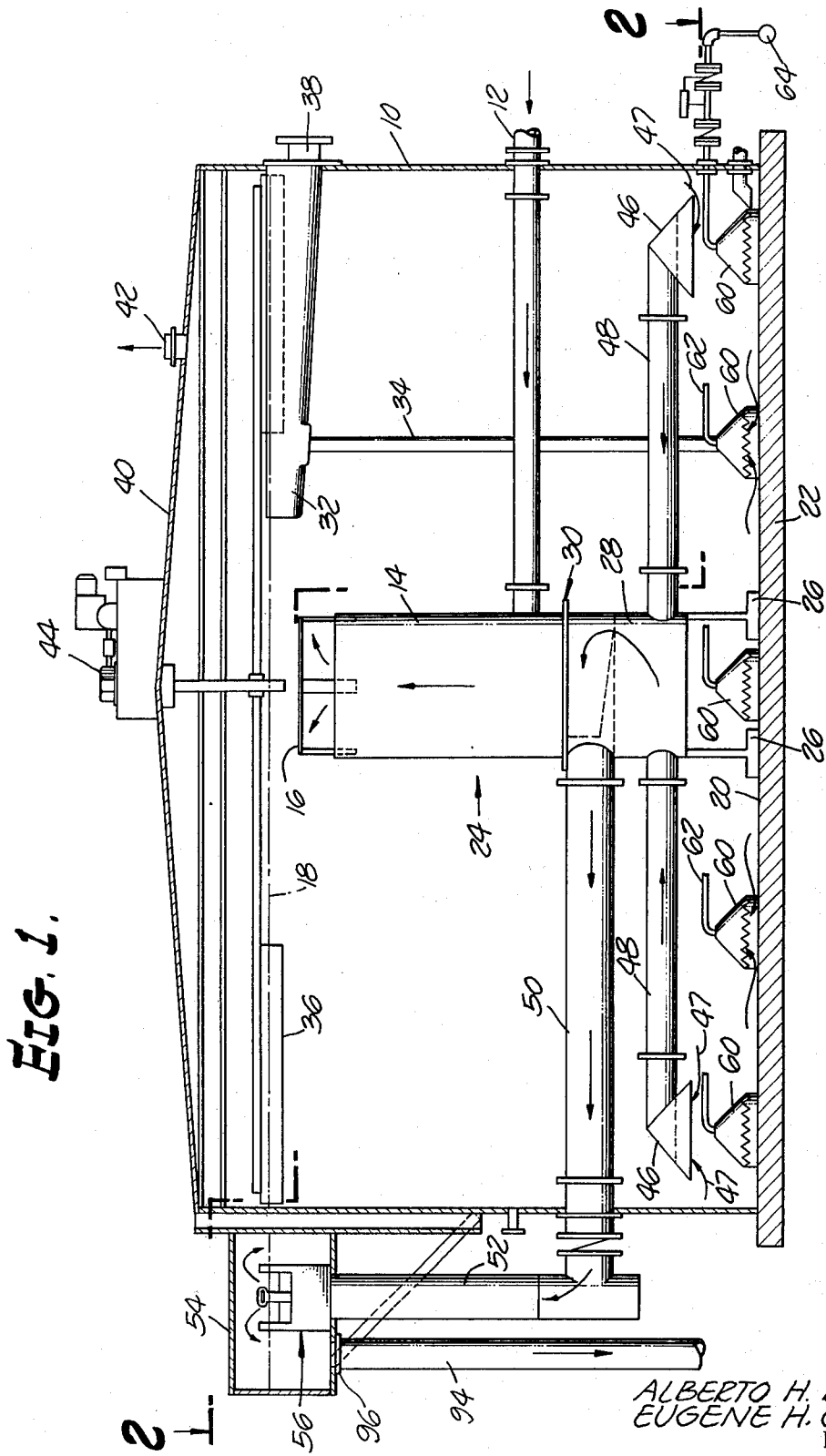
FIG. 1 shows, in partial cross section, a clarification tank or flotation cell used for removing relatively small amounts of oil from partially separated oil field water.

With reference to the apparatus shown in FIG. 1, the waste water (oil-water mixture) to be clarified is fed into the tank or flotation cell 10 through inlet pipe 12. The waste water is fed into the tank to an upper plenum chamber 14 and is released therein so that the air coming out of solution forms bubbles which rise in the plenum chamber 14 and attach to oil particles to effect separation of the oil by flotation of the oil to the surface where it forms a sludge layer at the surface 18 of the liquid in tank. The waste water feed material passes out of the upper end of the plenum chamber 14 as shown by arrows in the plenum chamber, and moves outwardly under cover plate or top 16. The oil particles, due to their lower specific gravity, move upwardly towards the liquid level 18 and there is a progressively decreasing oil content from the liquid level 18 to the bottom 20 of the flotation cell. Accordingly, purified water is removed from a point adjacent the bottom of the tank and the oil is removed as a sludge adjacent the liquid level 18 in the tank, as will be discussed hereinafter.

The tank 10 is mounted on a base pad 22, and the water feed and removal column 24 is positioned centrally within the tank and mounted therein on support pads 26. The column 24 is divided into an upper plenum chamber 14 and a lower plenum chamber 28 by a horizontal baffle 30. These chambers may be separate structures.

Oil is removed from the surface of the liquid into a sludge basin 32 which is supported by sludge basin support 34. Because of the corrosive nature of the liquid in the tank (hot salt water saturated with air and containing $H_2S$ and sand) the sludge basin is constructed of reinforced fibre glass plate. A rotary skimmer 36 is employed to move the sludge from the entire surface of the tank, into the sludge basin with a rotary sweep. The rotary skimmer is driven with a motor drive unit 44. The sludge is removed through the sludge basin drain 38. The flotation cell 10 has a roof 40 over the entire tank 10 including the sludge basin, and the roof is vented at 42.

Clean water is removed from the flotation cell 10 through a series of pick-up trays 46 which are circumferentially spaced within the tank and connected to the lower plenum chamber with pipes 48. The clean water flows in through the pick-up trays 46 and through the pipes 48 to the lower plenum chamber 28 and then through outlet 50 into the single vertical riser pipe 52.

Figure 2:
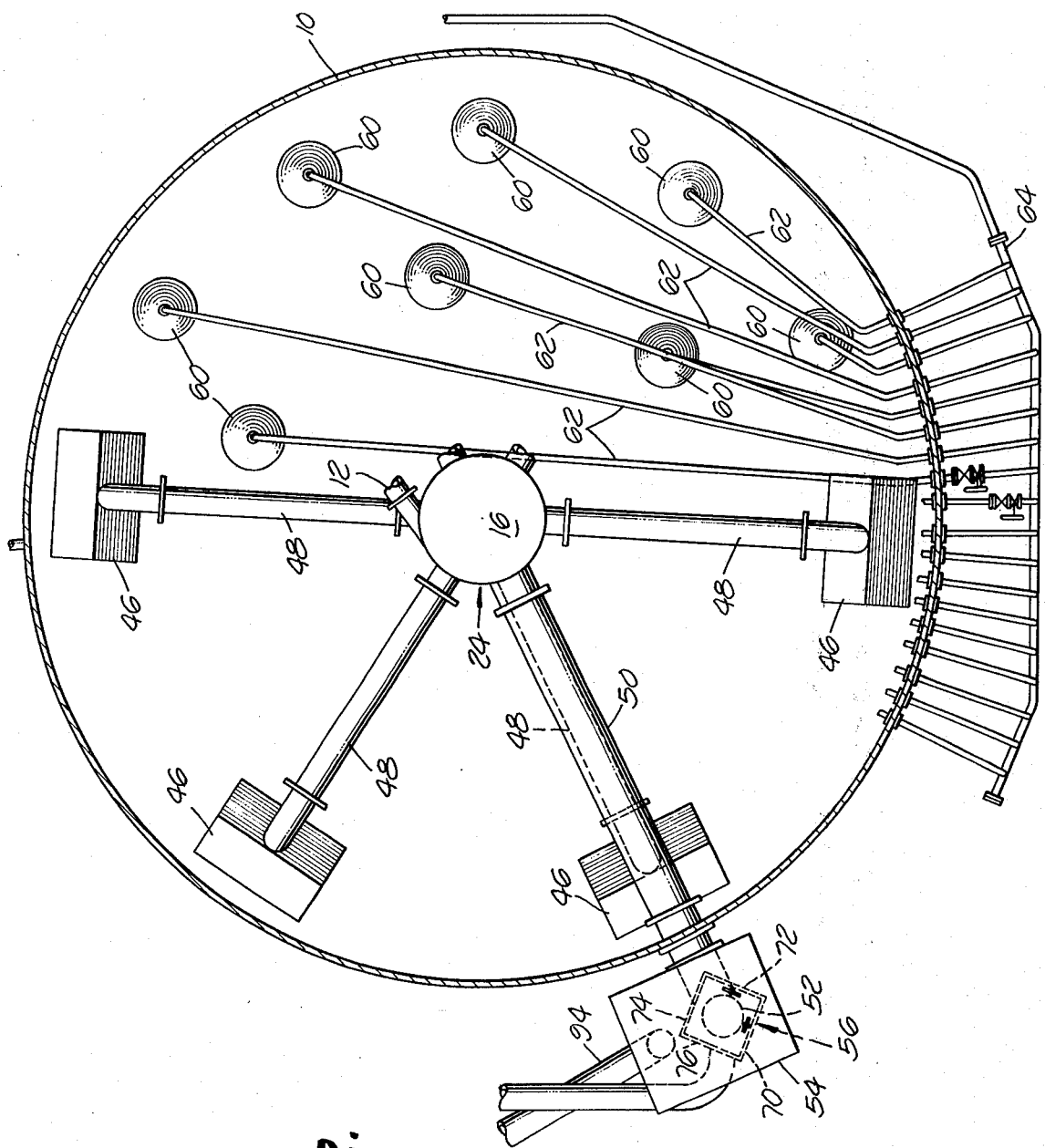
FIG. 2 is a plan view, partially in section, taken on line 2—2 of FIG. 1 showing the relative positions of the inlet column, the pick-up trays, the sand pan draw-offs, the removal line, and the weir box.

The pick-up trays 46 are arranged with bottom opening, so that settling sand, sediment, etc., will not be carried along with the clean water as it is removed from the tank. The cleaned water is withdrawn in the direction of the arrows 47 (FIG. 1). The shape of the pick-up trays and their arrangement in the tank are also shown in the plan view, FIG. 2.

The upper end of the riser pipe 52 extends into weir box 54 where the clean water is removed from the flotation cell system and the liquid level 18 in the flotation cell 11 is controlled. Riser pipe 52 extends into the lower end of an adjustable weir box which has four sides 70, 72, 74 and 76, two of which (70 and 72) are provided with vertically movable gates, as shown in FIG. 4 and two of which (74 and 76) are provided with fixed gates as shown in FIG. 5. Sides 70 and 72 are provided with gates 78 and 80 respectively, which are vertically movable with thread drives 59 which are manually lifted or lowered to different levels to control the liquid level in the tank. As best viewed in FIG. 4, the movable gate 78 is affixed to the lower end of bolt 61 and is moved upward or downward as the handle 63 is rotated. Likewise rotation of handle 65 moves gate 80 up or down. The lower panels 91, 93, 95 and the lower panel for side 76 are immovable. The level at which the water is released from the weir, controls the level of the liquid in the tank 10 since the riser is in effect a leg of manometer and the liquid level of the tank is the other leg of the manometer.

The sides 74 and 76 are provided with pairs of fixed gates 82, 84, 86 and 88. These gates are removed only when the liquid level in tank 18 is to be changed in large increments, e.g., when filling or emptying cell 10. Handles 90 and 92 are provided to facilitate removal of gates 82 and 84 respectively. The removal of gate 82 with handle 90 removes both gates 82 and 84. The gates 86 and 88 on side 76 are identical to those described above with respect to side 74. The clean water overflowing the gates of the weir box is removed therefrom through pipe 94 which is connected at its upper end 96 to the weir box.

The solids which are carried into the tank with the waste water are removed from the tank at the flat bottom 20 thereof through sand pan draw-offs 60 which are connected through line 62 to a single collector pipe 64. As shown in plan view FIG. 2, the sand pan draw-offs are spaced throughout the tank at the bottom thereof.

While our present invention has been described herein with reference to a preferred embodiment with a certain degree of particularity, it is to be understood that our invention is not limited to the details or embodiments set forth, but rather should be afforded the full scope of the appended claims.

We claim:

1. An apparatus for clarifying a liquid mixture, comprising:
    a. a tank having means for removing one component of said mixture at the liquid level in said tank;
    b. a central tube vertically disposed in said tank and having upper and lower plenum chambers therein;
    c. means for feeding said liquid mixture to said upper plenum chamber, said upper chamber having an opening therein for discharging said mixture into said tank to effect a separation of the liquid components of said mixture;
    d. a plurality of pick-up tubes of equal length and diameter each extending radially from said lower plenum chamber, each tube having a downwardly facing opening near the outer end thereof through which a second liquid component is withdrawn from the lower section of said tank through each of said tubes at equal flow rates into said lower plenum chamber;

a riser positioned exteriorly of said tank in fluid communication with said lower plenum chamber, said riser being of a size relative to said tank and said plenum chamber as to educt liquid from said tank through said lower plenum chamber; and f. an adjustable weir device at the upper end of said riser for controlling the rate of discharge of said second liquid component from said tank, and the liquid level in said tank.

* * * * *